United States Patent [19]

Kim

[11] 4,372,901

[45] Feb. 8, 1983

[54] PREFABRICATED PANEL CONSTRUCTION SYSTEM

[75] Inventor: Kwon S. Kim, Oklahoma City, Okla.

[73] Assignee: Star Manufacturing Co., Oklahoma City, Okla.

[21] Appl. No.: 231,087

[22] Filed: Feb. 3, 1981

Related U.S. Application Data

[60] Continuation of Ser. No. 40,971, May 21, 1979, abandoned, which is a division of Ser. No. 893,435, Apr. 4, 1978, Pat. No. 4,295,304.

[51] Int. Cl.³ .............................................. B29D 27/04
[52] U.S. Cl. ................................. 264/46.5; 52/309.2; 52/309.7; 264/46.7; 264/261
[58] Field of Search ................... 264/46.5, 46.7, 261; 52/309.2, 309.7, 309.16

[56] References Cited

U.S. PATENT DOCUMENTS

| | | | |
|---|---|---|---|
| 2,205,725 | 6/1940 | Kavanagh | 52/795 X |
| 3,206,902 | 9/1965 | Turnbull et al. | 52/795 |
| 3,283,386 | 11/1966 | Cenegy | 264/46.5 X |
| 3,313,073 | 4/1967 | Mathews | 52/309.7 X |
| 3,583,118 | 6/1971 | Lowery | 264/46.5 X |
| 3,711,581 | 1/1973 | Fowler et al. | 264/46.5 |
| 3,772,111 | 11/1973 | Ginsburg | 264/46.7 X |
| 3,820,295 | 6/1974 | Polley | 52/90 X |
| 3,845,183 | 10/1974 | Harrison | 264/46.7 X |
| 4,028,859 | 6/1977 | Bellagamba | 52/795 X |
| 4,107,833 | 8/1978 | Knight et al. | 264/46.7 X |

FOREIGN PATENT DOCUMENTS

| | | | |
|---|---|---|---|
| 2518978 | 11/1975 | Fed. Rep. of Germany | 428/313 |
| 851763 | 10/1960 | United Kingdom | 264/46.7 |

*Primary Examiner*—Philip E. Anderson
*Attorney, Agent, or Firm*—Hubbard, Thurman, Turner & Tucker

[57] ABSTRACT

A system of constructing a building using prefabricated wall and roof panels, each of the panels comprising interior and exterior corrugated metal sheets disposed on opposite major faces of a foamed core. The panels are assembled together in edge-to-edge relationship with complementary mating edges for securing adjacent panels. The joints between adjacent panels and between panels and support members are secured by self-drilling threaded fasteners. Metal strips are embedded in the panels to provide anchors for the threaded fasteners. A specially adapted insulating member is disposed along one edge of each panel to provide mechanical support without sacrificing thermal efficiency.

3 Claims, 19 Drawing Figures

PREFABRICATED PANEL CONSTRUCTION SYSTEM

This is a continuation of application Ser. No. 040,971, filed May 21, 1979, now abandoned which is a divisional of prior application Ser. No. 893,435, now U.S. Pat. No. 4,295,304 filed Apr. 4, 1978.

BACKGROUND OF THE INVENTION

The present invention relates generally to prefabricated buildings and more particularly to improved prefabricated panels and related assembly techniques.

Prefabricated construction owes its success to the economies of mass production and minimization of field assembly labor and skill. Accordingly, attention has been focused in the art on simplification of both manufacturing and field assembly techniques using modular panels which may be arranged in abutting relationship to form the walls and roof of a building. Typical prior art panels comprise thin metal sheets having strengthening corrugations and an insulating core of foam formed in place between the sheets.

One such prior art system is described in U.S. Pat. No. 3,290,845. The opposite edges of the panel described therein are adapted to mate with adjacent edges of similarly constructed panels. In particular, overlapping members are formed by extensions of the thin exterior material beyond the insulating layer at one panel edge to overlap a portion of the opposite edge of an adjacent panel. Pop rivets are used to secure the overlapping extension to the underlying member. The use of pop rivets as fasteners is relatively economical for assembly purposes; however, they present problems in the event panels need to be disassembled for any of various reasons. It would be desirable, therefore, to employ a fastening technique which permits disassembly of panels with relative ease, without damage to the panels and without sacrificing economy.

The use of "self-drilling" screws would achieve the desired purpose of convenient, nondamaging disassembly. Additionally, such threaded fasteners would save labor during initial installation when compared to pop rivets. A pop rivet requires the two separate operations of drilling a hole at the desired location and then installing the pop rivet therein. On the other hand, a self-drilling screw forms its own hole while being installed, as not surprisingly the name itself implies. Unfortunately, however, the relatively thin sheet metal faces of the metal-foam-metal prefabricated panels of the prior art are not sufficiently strong to hold a threaded fastener when subjected to the relatively high tension forces found at various points of attachment. This problem will occur at any joint in which tension is exerted between the fastener's threads and sheet metal. Since the sheet metal is purposefully made as thin as possible, tension forces due to wind lift and the like can cause the threaded fastener to tear loose from the panel. It will be appreciated that a heretofore advantage of using pop rivets at such tension joints rather than threaded fasteners is that a relatively large bearing surface is achieved at the interface of the pop rivet and the inner surface of the metal sheet.

Thus, an important object of the present invention is to provide a means for securing a threaded fastener at a tension joint formed in a metal-foam-metal type prefabricated panel with mechanical performance equal or superior to a pop rivet or the like, yet without sacrificing economy and enabling disassembly with relative ease.

SUMMARY OF THE INVENTION

The present invention concerns a construction system employing prefabricated panels each of which comprises: a body of insulating material, first and second metal sheets disposed on opposite major faces of the body, and at least one anchor member disposed along the inner surface of one of the metal sheets to engage a threaded fastener.

An important advantage of the inventive construction system is that self-drilling threaded fasteners may be used at critical mechanical joints between adjacent panels and between panels and support members. The anchor members in the panels provide greater engaging area for the threads of the fasteners such that greater tension forces can be withstood without the fasteners pulling loose.

By virtue of the use of such self-drilling threaded fasteners at joints between adjacent panels, a novel edge construction is employed at the sides of the panels. Complementary leading and trailing edges are employed at opposite sides of both wall and roof panels such that side joints may be formed that are mechanically secure, thermally efficient and weathertight.

The novel features believed characteristic of the invention are set forth in the appended claims. The nature of the invention, however, as well as its essential features and advantages may be understood more fully upon consideration of illustrative embodiments, when read in conjunction with the accompanying drawings, wherein:

DESCRIPTION OF THE PREFERRED EMBODIMENTS

In the following description and in the figures, similar numerals are used to designate similar elements. Appended letters are used in some cases to positionally differentiate between like elements.

Figure 1:
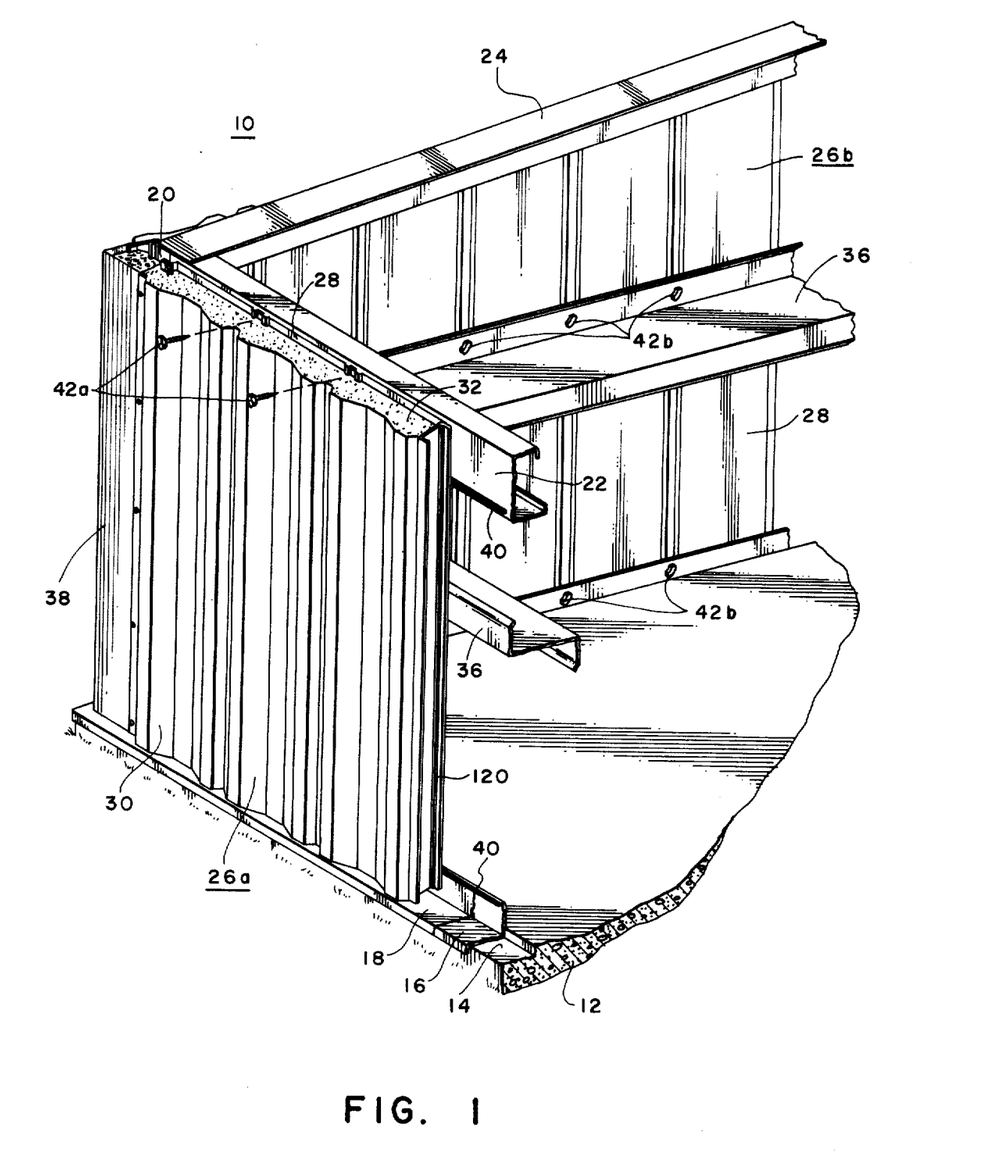
FIG. 1 is an isometric view of a corner portion of a partially assembled prefabricated building of the present invention.
Figure 6:
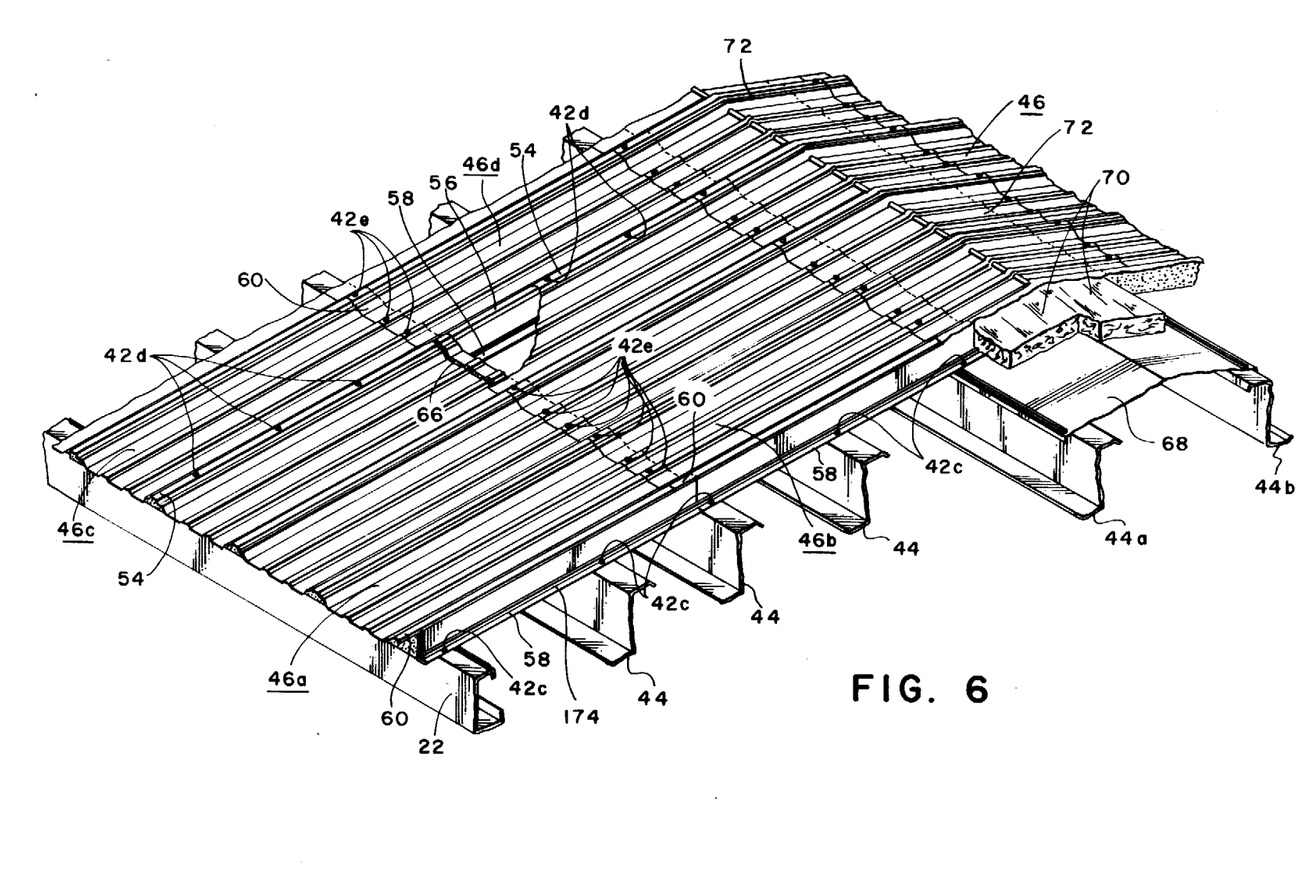
FIG. 6 is an isometric view of a portion of a roof and supporting structure of the inventive building.
Figure 7:
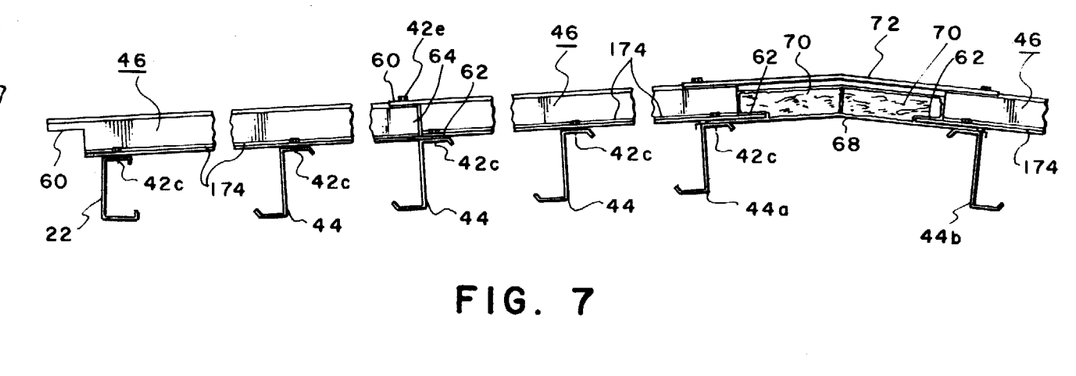
FIG. 7 is an edge view of the roof illustrated in FIG. 6.

Referring to FIG. 1, a corner portion of a prefabricated construction system or building 10 is illustrated at an intermediate stage of erection. A concrete floor or foundation 12 is provided with a formed peripheral edge 14 upon which are mounted steel support members 16, commonly referred to as base angles. Covering each base angle 16 is a base flash 18, which comprises thin preformed sheet metal having a suitable weatherized surface. Vertical support columns, such as the mostly hidden corner column 20, are erected in a conventional manner where needed for supporting upper level support members, as exemplified by an eave strut 22 and a rake angle 24. The corner column 20 is preferably covered along its exterior with a weatherized trim in a conventional manner, which is left unshown for ease of illustration. It will be appreciated that the rake angle 24 is pitched to provide a sloped roof as seen in FIGS. 6 and 7 yet to be described. The peripheral walls of the building 10 comprise sidewall panels 26a and endwall panels 26b of similar prefabricated construction.

Figure 2:
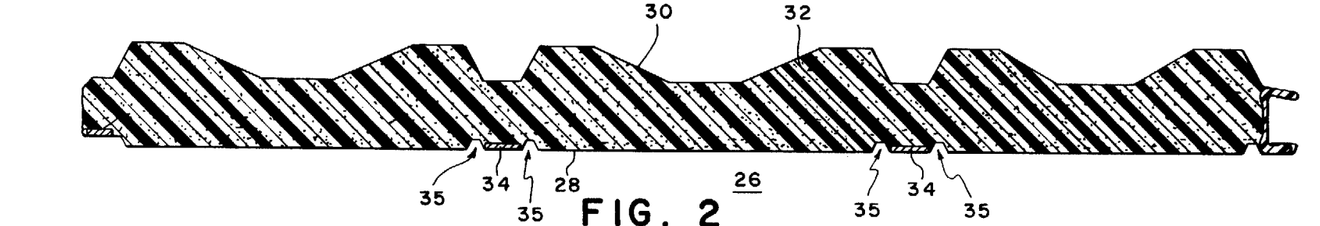
FIG. 2 is a sectional view through a prefabricated wall panel of the present invention.

Referring to FIG. 2, a preferred wall panel 26, which may be used for constructing both the sides of the building 10, comprises interior and exterior corrugated metal sheets 28 and 30, which are laminated to an insulating core or body 32 foamed in place therebetween in a known manner. The terms "interior" and "exterior" are used herein with reference to a positional relationship with respect to the interior and exterior of the building 10. The sheets 28 and 30 preferably comprise 26-gauge steel, which is galvanized and painted in accordance with known techniques. The core 32 may comprise any material that has good mechanical strength and thermal insulation properties, the preferred material comprising isocyanurate plastic foam with an approximate density of 2.2 pounds per cubic foot. Fastener strips 34, preferably comprising a relatively heavy guage metal, are disposed at spaced intervals in the panel just inside the interior sheet 28 to serve as anchors for threaded fasteners and to add strength at points of attachment to the support structure. Corrugated grooves 35 on either side of the fastener strips 34 provide a means for holding the strips 34 in place during formation of the foam core 32. In addition, the grooves 35 serve to identify the location of the strips 34 from outside the panel 26 to facilitate installation of fasteners therein. The edge construction of the sides of the wall panel 26 will be described in detail below with particular reference to FIG. 13.

Referring again to FIG. 1, horizontal girts 36 of conventional construction may be employed to provide additional support for the wall panels 26, depending on the requirements of the particular building. It will be appreciated that the sidewalls 26a will comprise panels of uniform height, whereas the endwalls 26b will comprise panels of varying height to adjust for the pitch of the roof. An insulation filled flashing 38 is provided at each corner to complete the periphery of the building 10. Vapor seals 40 are provided as shown to prevent the accumulation of condensation, the material and manner of application of such seals being known in the art. The vapor seals 40 preferably comprise a low permeable flexible polyvinylchloride foam tape with adhesive backing.

Figure 3:
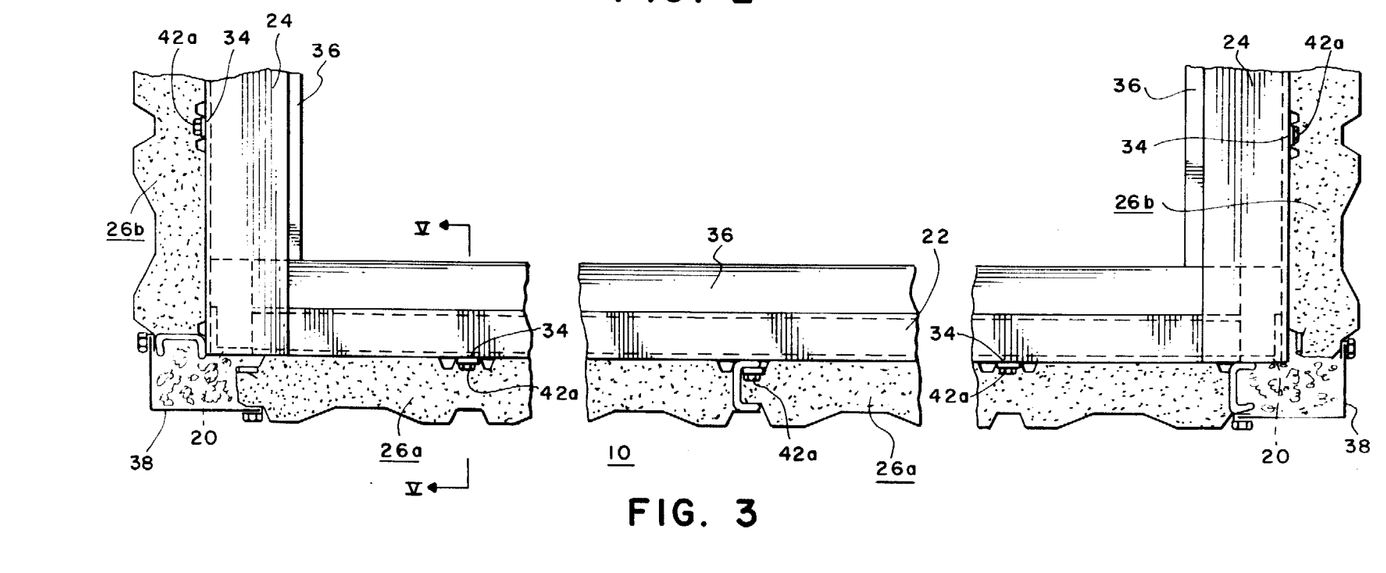
FIG. 3 is a top view of two corners and a common wall of the inventive building.
Figure 4:
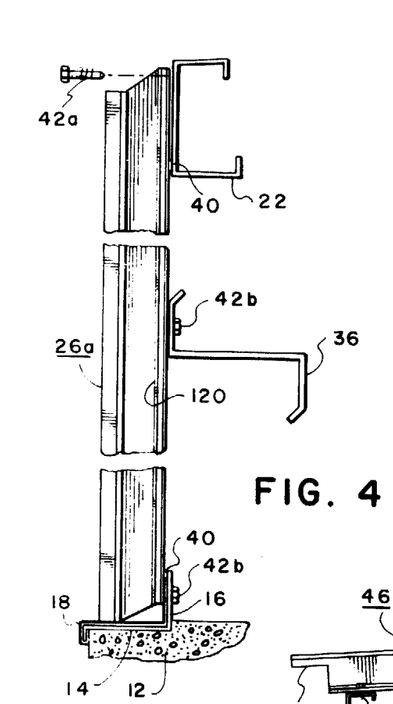
FIG. 4 is an elevational view of a sidewall of the inventive building.
Figure 5:
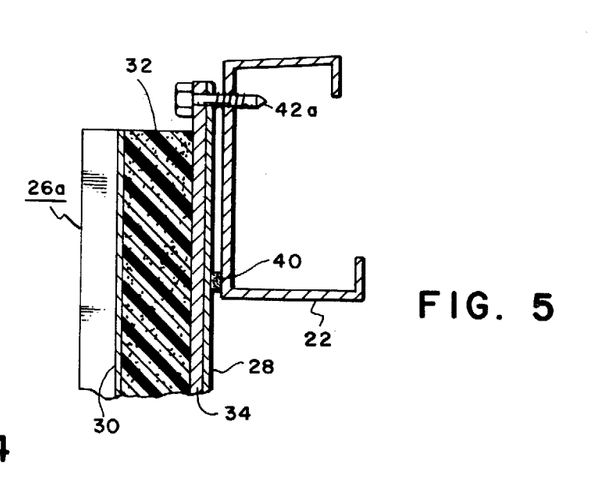
FIG. 5 is a vertical cross-section of an upper portion of the wall of FIG. 3 taken along line V—V.

The manner of securing the wall panels 26 to the support structure will now be described with particular reference to FIGS. 3–5. Securing sidewall and endwall panels 26a and 26b to cave strut and rake angle members 22 and 24 is accomplished in accordance with an important feature of the present invention by means of self-drilling threaded fasteners 42a. In order to facilitate installation of the fasteners 42a at the upper ends of the panels 26 from outside the building 10, the edges of the panels are mitered as best seen in FIG. 4, and the interior sheet 28 and fastener strips 34 are extended beyond the foam body 32 and exterior sheet 30 as best seen in FIG. 5. It will be appreciated that the relatively thick fastener strips 34 increase the bearing surface of the relatively thin interior sheet 28 for resisting the forces applied by the fasteners 42a.

Another important feature of the present invention involves the fastening of wall panels 26 to the base angles 16 and girts 36. Self-drilling threaded fasteners 42b are installed from the inside of the building 10 through the girts 36 and base angles 16 into the panels 26a and 26b as seen in FIGS. 1 and 4. The fastener strip 34 provides an anchor for the threads of the fasteners 42b to work against. Without the fastener strip 34, threaded fasteners passing through a support and then into a wall panel would only have the relatively thin metal of the interior sheet 28 to work against, which could more readily be stripped free from the fastener's threads. The likelihood of such occurrence is minimized by providing the fastener strips 34 disposed in the panels 26 in the manner depicted in FIG. 2. The fastener strips 34, therefore, should be sufficiently thick to securely anchor the threads of the fasteners 42b, the harder the material the thinner the strips 34 may be made. Preferably, the fastener strips 34 comprise a hard metal such as steel with a minimum thickness of 0.064 inch. Such a steel strip 34 has been found to perform satisfactorily with No. 12-14 self-drilling screws employed as fasteners.

It will be appreciated that the fastener strips 34 might either be continuous along the length of the panels 26, or might only be included in lengths of a few inches at predetermined points of attachment. In the case where discontinuous strips are used, strip inserts can be field installed where needed when panels are modified for the installation of window frames and the like. A desirable feature provided by the use of continuous strips 34 is that shelves or the like may be conveniently installed in the interior of the building 10 by attachment at selected points along the fastener strips 34. Such shelves, which may be installed in like manner to the girts 36, will support greater loads than would otherwise be the case in the absence of the fastener strips 34.

Figure 8:
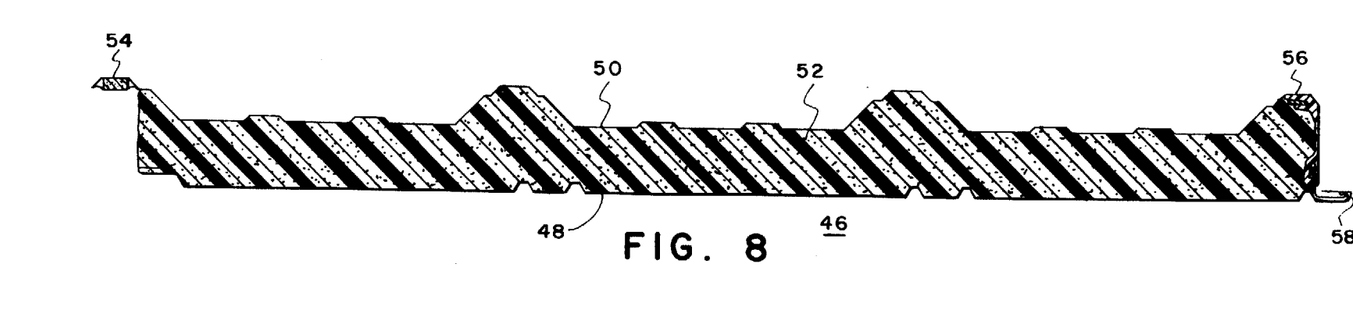
FIG. 8 is a sectional view through a prefabricated roof panel of the present invention.

Referring to FIGS. 6-8, a preferred roof system of the inventive building 10 is illustrated. A plurality of generally Z-shaped purlins 44 of known construction are arranged in parallel to the eave struts 22 and disposed at spaced intervals to provide support for a plurality of roof panels 46. Adjacent panels are contiguously arrayed in side-by-side and end-to-end abutting relationship as depicted by roof panels 46a, 46b, 46c, and 46d in FIG. 6. As used herein, the sides of panels are defined as the edges running parallel to the corrugations, and the ends of panels are defined as the edges running transversely to the corrugations as illustrated.

While particular reference to FIG. 8, the preferred roof panel 46 comprises interior and exterior corrugated metal sheets 48 and 50 which are laminated to an insulating core or body 52 foamed in place therebetween. The materials employed are similar to those mentioned above in the description of the wall panel 26 of FIG. 2. The exterior sheet 50 has an extension beyond one side of the foam body 52 forming a flap 54 for overlapping an edge portion 56 of an adjacent previously mounted panel. The interior sheet 48 has an extension in the form of a rolled or folded edge 58 on the side of the foam body 52 opposite from the flap 54 to facilitate fastening the roof panel 46 to the underlying support structure. The edge construction of the sides of the roof panel 46 will be described in detail below with particular reference to FIG. 15.

The roof panels 46 are secured to eave struts 22 and purlins 44 by self-drilling threaded fasteners 42c, in the manner depicted in FIGS. 6 and 7. The overlapping flaps 54 are secured to the underlying edge portions 56 by self-drilling threaded fasteners 42d as depicted in FIG. 6. The roof panels 46 have upper and lower end flaps 60 and 62, seen best in FIG. 7, formed by extensions of the exterior and interior metal sheets 50 and 48 respectively, which permit the formation of a secure joint at abutting ends of adjacent panels 46. In erecting the building 10, the lowermost roof panels, typified by panels 46a and 46c, are secured to the support structure, a mastic sealing material 66 is applied along the upper exterior ends as shown in FIG. 6, and then the next higher panels, typified by panels 46b and 46d, are arranged with the end flaps 60 overlapping the previously mounted panels 46a and 46c. The mastic sealant 66, which underlies the end flaps 60, preferably comprises a butyl composition of suitable viscosity, which is applied in accordance with known techniques. The end flaps 60 of panels 46b and 46d are secured to the underlying panels 46a and 46c respectively by self-drilling fasteners 42e located at spaced intervals generally in line with the sealant 66.

Prior to assembling the uppermost roof panels, typified by panels 46b and 46d, a ridge liner 68 is installed across the uppermost purlins 44a and 44b. The ridge liner 68 comprises a plurality of preformed metal sheets of conventional construction (only one being shown). After securing the uppermost roof panels to purlins 44a and 44b, a suitable filler insulation 70 is laid on the ridge liner 68 and a ridge cap 72 is installed thereover in the manner depicted. The ridge cap 72 comprises metal sheets having corrugations conforming to the corrugations of the roof panels 46.

Figure 9:
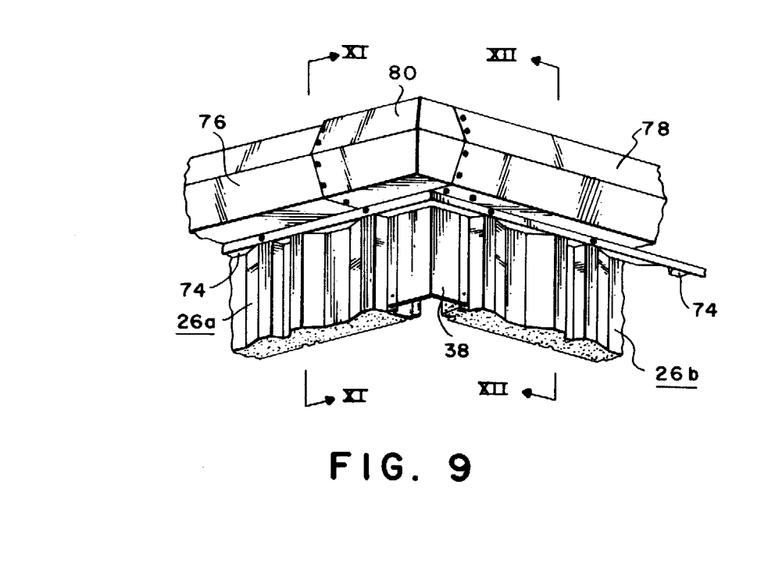
FIG. 9 is an isometric view of a corner of the inventive building.

In FIGS. 9-12, a preferred trim arrangement for the wall-roof juncture of the present construction system is illustrated. Closure strips 74 are installed around the upper periphery of the walls 26 as best seen in FIG. 9. The closure strips 74 have inner surfaces adapted to conform to the corrugated exterior of the walls 26 and have flat outer surfaces to facilitate mounting the trim. The trim comprises an eave box arrangement 76 along sidewalls 26a, a gable flash arrangement 78 along end walls 26b, and corner trim 80 as depicted in FIG. 9.

Figure 10:
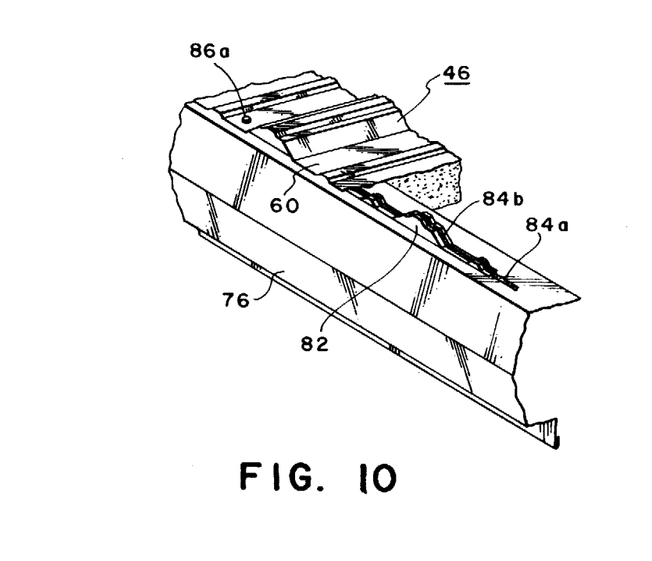
FIG. 10 is an isometric view of a portion of a roof and eave box of the inventive building.
Figure 11:
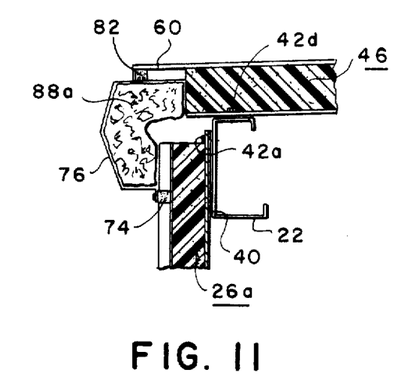
FIGS. 11 and 12 are vertical cross-sections taken respectively along lines XI—XI and XII—XII as indicated in FIG. 9.
Figure 12:
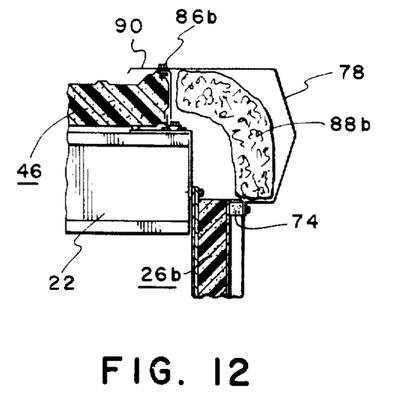

FIG. 10 illustrates the manner in which the end flap 60 of a typical roof panel 46 is attached to the eave box trim 76. A rubber filler strip 82 is affixed with an adhesive and sealing material 84a to the top of the eave box 76. The strip 82 has an upper surface adapted to conform to the corrugations of the sheet metal end flap 60, which is affixed thereto by adhesive and sealing material 84b and fasteners 86a. Prior to mounting the roof panels 46, filler insulation 88a is installed in the eave box 76 as seen in FIG. 11. After mounting the roof panels 46, the gable flash 78 with filler insulation 88b installed therein is mounted as seen in FIG. 12. The gable flash has an extension 90 which overlaps the edge of the roof panels 46 and is attached thereto by fasteners 86b.

Figure 13:
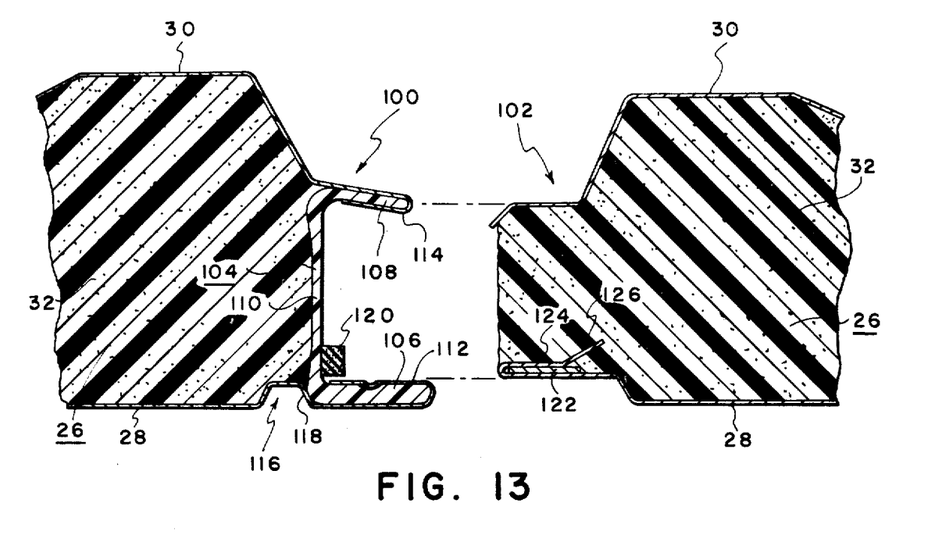
FIG. 13 is a sectional view through leading and trailing edges of spaced-apart adjacent wall panels of the type shown in FIG. 2.
Figure 14:
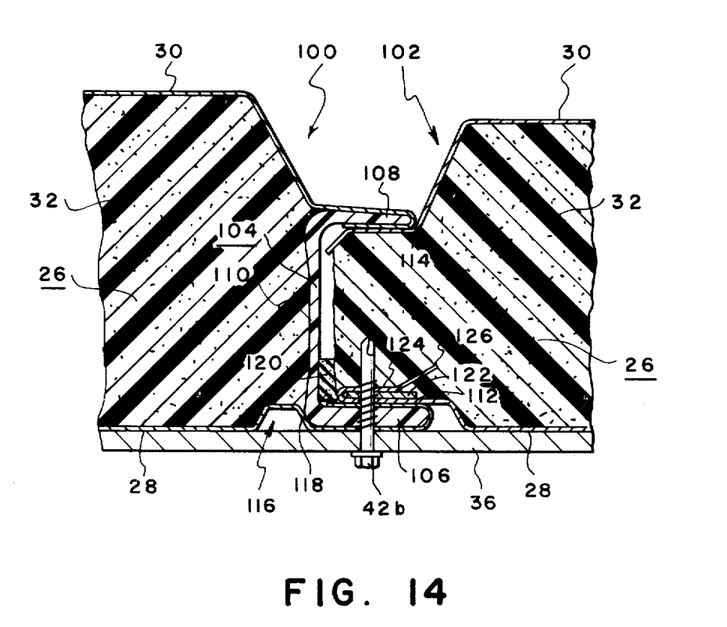
FIG. 14 is a sectional view through a joint formed by mating the adjacent edges of the wall panels shown in FIG. 13.

Now referring to FIG. 13, a preferred edge configuration at the sides of the wall panels 26 will be described. Each wall panel 26 has a leading edge 100 and a trailing edge 102 having complementary configurations which provide a mechanically and environmentally secured joint when adjacent panels are erected side by side as seen in FIG. 14. The terms "leading" and "trailing" are used herein with reference to the joint made between adjacent panels when erected to the intended manner, wherein the leading edge of an earlier erected panel serves to locate the trailing edge of a later erected panel.

The leading edge 100 comprises a nonmetallic generally C-shaped channel member 104 for interlocking the metal sheets 28 and 30. The channel 104 may be fabricated from an insulating material such as molded or extruded plastic or fiberglass of good strength and capable of withstanding extreme weather conditions. The channel 104 has first and second flange portions 106 and 108 extending from a transverse portion or webb 110. Rolled or folded edge portions 112 and 114 of the metal sheets 28 and 30 provide envelopes for holding the flanges 106 and 108 therein, the resulting structure providing edge strength as well as facilitating handling during manufacturing. A corrugated groove 116 in the interior sheet 28 provides a shoulder 118 which serves to locate the flange 106 in proper position in the folded metal portion 112. The flange 108 together with conforming metal portion 114 is bent inward slightly in such a manner as to grip and fit tightly over the trailing edge 102 of an adjacent panel when inserted therein as seen in FIG. 14. Thus, it is preferred that the channel 104 comprises a suitably resilient material to provide tension for gripping the trailing edge 102 in such manner. A factory-applied vapor seal 120 comprising a suitable compressible mastic is affixed to the channel webb 110 in the corner nearest the flange 106. The seal 120 preferably comprises a flexible polyvinyl chloride foam tape with an adhesive backing.

The trailing edge 102 has a fastener strip 122 that preferably runs the full length of the panel 26 to provide an anchor for engaging the threads of a self-drilling threaded fastener 42b as seen in FIG. 14. The fastener strip 122 preferably comprises a relatively heavy gauge metal compared to that of the metal sheet 28, and most preferably comprises steel having the same thickness as the fastener strips 34 previously described. The strip 122 is held in place during the formation of the foam core 32 by a rolled edge portion 124 of the interior metal sheet 28. During the formation of the core 32, the panel 26 is braced using forms (not shown) in a conventional manner to assure that the expanding foam will be restrained so as to achieve the desired panel thickness particularly at the trailing edge 102. The rolled edge 124 terminates in an inwardly extending flange 126, which strengthens the foam-metal bond in the vicinity of the fastener strip 122. The depth of penetration of the flange 126 into the foam core 32 is not critical, thus the flange 126 conveniently compensates for tolerance variations in the width of the metal sheet 28.

It should be noted that, wherever useful, the self-drilling threaded fasteners employed in the present construction system 10 are thread relieved in the vicinity of the head as typified by the fastener 42b in FIG. 14. Such relieved threads permit the fastener to turn with relative ease in the member, typified by girt 36, that is nearest the fastener head, while the member or members farthest from the head are drilled through and pulled up tight, as typified by the leading and trailing edges 100 and 102 of the panels 26. It will be appreciated that this feature is particularly useful where the first member through which the fastener passes is relatively thick, by which is meant several times thicker than that of the sheet metal used in the inventive panels. Typically, after passing through the first member, the fastener momentarily pushes against the second member until it is drilled through, thereby developing a gap between the first and second members. Such a gap might remain in the absence of relieved threads near the head, particularly if an automatic screw gun or the like is used to install the fasteners. However, with the threads being relieved near the head by about the thickness of the first member, the fastener will turn with relative ease until the gap is closed.

Referring briefly again to FIG. 5, it is preferred that the fasteners employed at the upper ends of the wall panels 26, as typified by fastener 42a, are also thread relieved in like manner to fasteners 42b for the above-mentioned reasons. However, in the example of fastener 42a, the first member comprises the panel 26a and the second member comprises the eave strut 22, such that the threads of fastener 42a are relieved by about the thickness of the fastener strip 34.

Now referring to FIG. 15, a preferred edge configuration at the sides of the roof panels 46 will be described. Each roof panel 46 has a leading edge 130 and a trailing edge 132 having complementary configurations which provide a mechanically and environmentally secure joint when adjacent panels are erected side by side as seen in FIG. 16, the terms "leading" and "trailing" being defined above.

The leading edge 130 comprises a generally Z-shaped tie member assembly 134 having interlocked generally L-shaped members 136 and 138. The upper L-shaped member 136 comprises an insulating material having properties similar to the channel 104 described above. The lower L-shaped member 138 is metallic, preferably 24-gauge steel.

The L-shaped insulating member 136 has a webb portion 140 joining upper and lower end portions 142 and 144. The upper end 142 extends under the edge 56 of the upper metal sheet 50, which is affixed thereto by a suitable adhesive (not shown). The lower end 144 of the member 136 extends downward from the webb 140 to engage the metallic member 138 as will be described with more particularity below in conjunction with FIGS. 17 and 18.

The upper end 142 of the insulating member 136 has first and second fingers 146 and 148 forming a groove for holding a fastener strip 150. The fastener strip 150 preferably comprises a relatively heavy gauge steel similar to that of previously mentioned fastener strips 34 and 122. The strip 150 serves to anchor the threads of a self-drilling fastener in the manner depicted in FIG. 16 as will be described more fully below. The fingers 146 and 148 resiliently grip the strip 150 when inserted therebetween with sufficient force to hold the strip 150 in place during formation of the core 52.

Figures 15, 16, 17, 18:
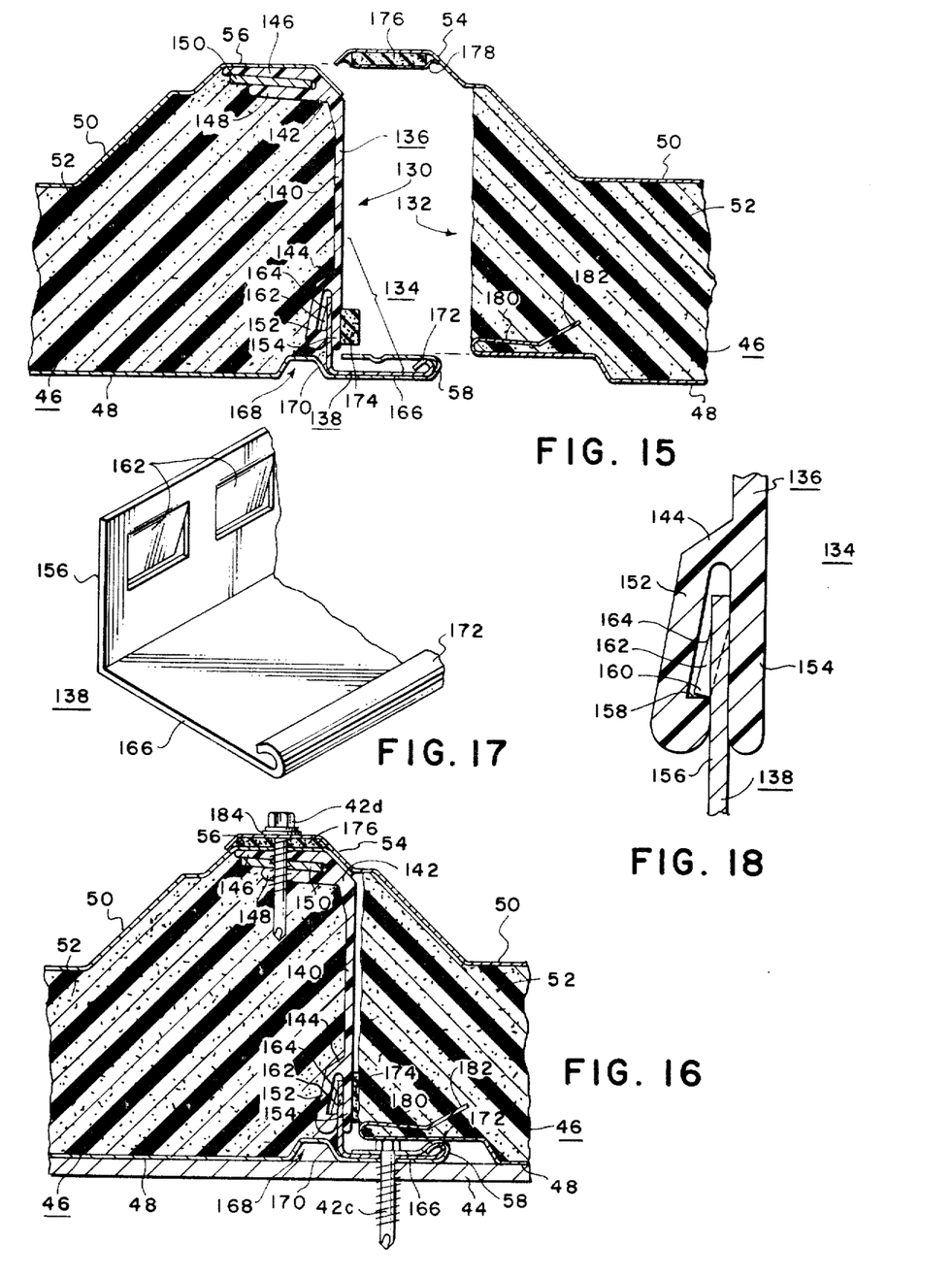
FIG. 15 is a sectional view through leading and trailing edges of spaced-apart adjacent roof panels of the type shown in FIG. 8.
FIG. 16 is a sectional view through a joint formed by mating the adjacent edges of the roof panels shown in FIG. 15.
FIG. 17 is an enlarged isometric view of a portion of an L-shaped metallic member used in the leading edge of the inventive roof panel.
FIG. 18 is a sectional view of an upper portion of the metallic member of FIG. 17 shown in interlocking engagement with a lower end of an insulating member enlarged to illustrate features of the leading edge of the inventive roof panel.

Referring to FIGS. 17 and 18 in conjunction with FIG. 15, the manner of interconnecting the two L-shaped members 136 and 138 into the single Z-shaped tie member 134 will now be described. The lower end 144 of the L-shaped insulating member 136 has inner and outer fingers 152 and 154 forming a slot for engaging a first, generally upward extending leg portion 156 of the L-shaped metallic member 138. The inner finger 152 has a shelf 158 or suitable surface as depicted in FIG. 18 for engaging a complementary edge 160 of the member 138. One method for forming the edge 160 is by stamping tooth-like projections 162 at spaced intervals as depicted in FIG. 17 using conventional tool and die techniques. Alternately, the leg 156 could be folded back over itself (not illustrated) at its upper end in a suitable manner to provide a surface for engaging the shelf 158 to lock the members 136 and 138 together. However, it is preferred that a gradually sloping surface 164 be provided so that the members 136 and 138 may be assembled with minimum force by merely inserting the leg 156 of member 138 between the fingers 152 and 154, which gradually spread apart and then snap back when the projecting edge 160 passes the shelf 158, thereby interlocking the L-shaped members 136 and 138 together to form the Z-shaped assembly 134. Any degree of relative movement of the members 136 and 138 is eliminated when the foam core 52 is formed since the expanding foam puts the members 136 and 138 in tension.

The metallic L-shaped member 138 has a second leg portion 166 which is inserted in the manner depicted in FIG. 15 into the envelope formed by the folded extension 58 of the metal sheet 48 to provide good mechanical strength to the panel 46 at points of attachment to the support structure. A corrugated groove 168 in the lower metal sheet 48 provides a shoulder 170 which serves to locatethe leg 106 in proper position in the folded metal extension 58. The leg 166 terminates in a curled end 172 to provide both strength and additional thickness to the outermost edge of the extension 58. It will be appreciated from the view of FIG. 16 that, due to the curled end 172 of the member 138, the heads of the fasteners 42c do not cause the trailing edge 132 of the adjacent panel 46 to ride up, which would occur without the curled end 172 providing additional thickness to the outermost edge of the extension 58.

A factory-applied vapor seal 174 comprising a suitable compressible mastic is applied to the lowermost exterior surface of the insulating member 136. The seal 174 preferably comprises the same material and is affixed in like manner as the seal 120 described above.

The trailing edge 132 of the inventive roof panel 46 is equipped with a factory-applied sealant 176 affixed in place under the flap extension 54 of the upper metal sheet 50. The sealant 176 is protected until the time of installation of the panel 46 by a suitable covering 178, such as a wax paper adhesively fixed in place as seen in FIG. 15. The covering 178 is removed just prior to laying the trailing edge 132 over the adjacent leading edge 130 to form the side joint seen in FIG. 16. The sealant 176 preferably comprises a mastic material such as a butyl rubber composition of suitable viscosity, which is compressed between the flap 54 and the edge 56 by the installation of the fasteners 42d.

The lower metal sheet 48 has a rolled or folded edge portion 180 at trailing edge 132 of the panel 46 to provide added strength thereto as well as to self compensate for tolerance variations in the width of the metal sheet 48. The rolled edge 180 terminates in an inwardly extending flange 182, which strengthens the bond between the metal sheet 48 and the foam core 52 along the edge 132.

Thus it will be appreciated that adjacent roof panels 46 having the above-described construction may be assembled side by side to produce a weather-tight joint as seen in FIG. 16 with the convenience of self-drilling threaded fasteners 42c and 42d. The use of separate fasteners 42c and 42d to attach the leading edge 130 to a supporting purlin 44 or the like and the trailing edge 132 to the leading edge 130 permits the formation of a mechanically secure joint while maintaining thermal insulation between interior and exterior metal sheets 48 and 50. Unlike some prior art systems that employ "through fasteners" from outside into the support structure thereby compressing the foam insulation, the roof panels of the present invention are secured to the supporting purlins 44, as typified in FIG. 16, without compressing the insulation at the points of attachment. The fastener 42c and similar fasteners are preferably thread relieved in like manner to the fastener 42b as described above in conjunction with FIG. 14, due to the thickness of the first member through which fastener 42c passes, which in this case comprises the cumulative thickness of the sheet metal layers of the folded extension 58 and the leg 166 of the member 138 therebetween. On the other hand, the fastener 42d and similar fasteners need not be thread relieved since the metal sheet 50 through which they first pass is thin enough to allow the fasteners 42d to turn with relative ease until the flap 54 and underlying edge 56 are pulled tightly together. Most preferably, however, the fasteners 42d are equipped with a compressible washer 184 as shown in FIG. 16 to prevent water seepage through the flap 54. It will be appreciated that the fastener strip 150 anchors the threads of each of the fasteners 42d to permit the flap 54 to be pulled tight against the edge 56, thereby compressing the sealant 176 therebetween.

Figure 19:
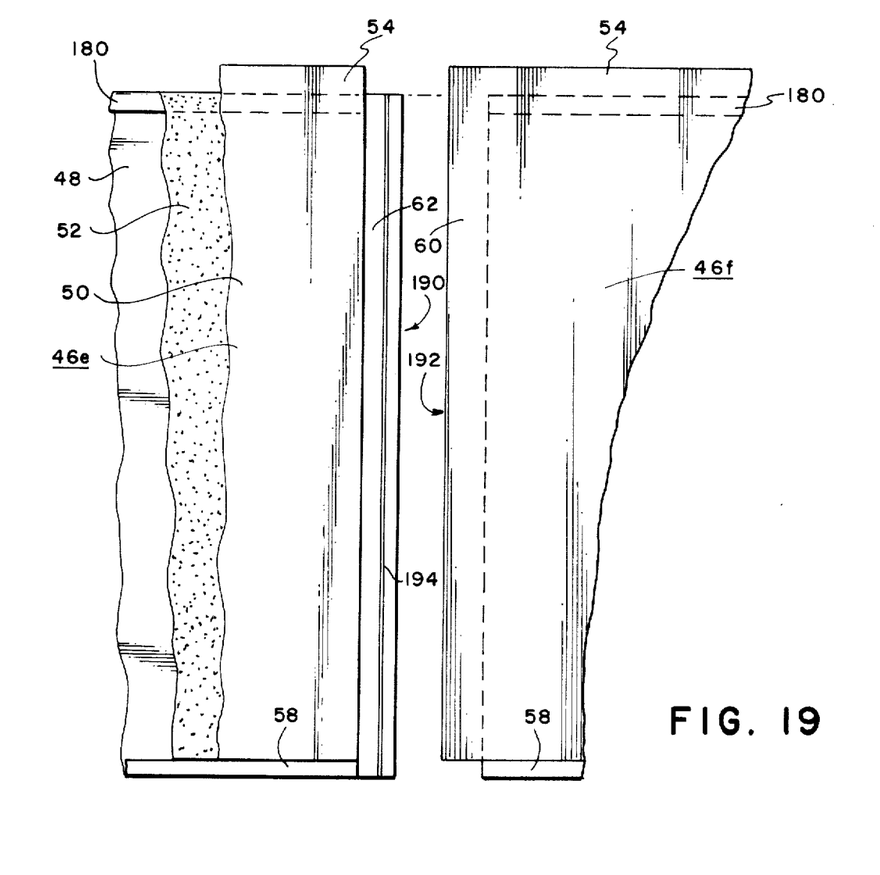
FIG. 19 is a top view of adjacent roof panels (corrugations not shown) spaced apart prior to assembly.

Now referring to FIG. 19, the preferred manner in which a weather-tight joint is formed at abutting ends of adjacent roof panels 46 is illustrated. A first panel 46c having a leading end 190 and a second panel 46f having a trailing end 192 are shown in spaced apart relationship just prior to being joined end to end. The rolled or folded edges 58 and 180 of the lower metal sheet 48 terminate flush with the foam core 52 at both ends 190 and 192 in the manner depicted. Thus, the trailing end 192 can be seated in the end flap 62 of leading end 190 without riding up at the corners. A factory-applied vapor seal 194, similar to the previously described seals 120 and 174, is affixed at the outermost edge of end flap 62 on the upper surface thereof, and is thereby compressed in the end joint formed when panel 46f is laid in end-to-end abutting relationship with panel 46c.

Although preferred embodiments have been described in detail, it is to be understood that various changes, substitutions and alterations can be made therein without departing from the spirit and scope of the invention as defined in the appended claims.

What is claimed is:

1. A method of making a prefabricated construction panel comprising the steps of:
   (a) providing first and second sheets, at least one of said sheets having a plurality of elongated cavities formed by and between adjacent elongated corrugations formed in said one sheet, said cavities extending at least to one edge of said one sheet;
   (b) arranging said first and second sheets in parallel spaced relation to each other;
   (c) providing a plurality of elongated fastener receiving members, said fastener receiving members each comprising a continuous flat strip of metal having a length corresponding substantially to the length of said cavities and a width limited to that which will permit positioning said fastener receiving members in said cavities and against an inside surface of said one sheet;
   (d) locating said fastener receiving members with respect to said one sheet by positioning one of fastener receiving members in selected ones of said cavities, respectively, against said inside surface for receiving, in use, screw threaded fastener members threaded into said panel in a selected position from the outside surface of said one sheet for securing said panel to a structural support; and
   (e) securing said fastener receiving members within said cavities by filling the space between said sheets with an insulating material, said insulating material, upon filling said space, serving to hold said fastener receiving members in said cavities and against said inside surface.

2. The method according to claim 1 wherein:
said insulating material comprises a foamed plastic and said space is filled with said insulating material by foaming said plastic between said sheets to fill said space.

3. The method according to claim 1 wherein:
said one edge of said one sheet is offset with respect to the corresponding edge of the other of said sheets whereby a portion of each of said fastener receiving members adjacent said one edge is exposed for receiving a fastener driven through said fastener receiving member and then said one sheet from said inside surface.

* * * * *